United States Patent
Lehtiniemi et al.

(10) Patent No.: US 6,466,299 B1
(45) Date of Patent: Oct. 15, 2002

(54) MOBILE STATION AND COVER FOR MOBILE STATION HAVING THERMOCHROMIC LIQUID CRYSTALS

(75) Inventors: Reijo Lehtiniemi, Helsinki (FI); Juha Paldanius, Klaukkala (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/473,250

(22) Filed: Dec. 27, 1999

(30) Foreign Application Priority Data

Dec. 30, 1998 (FI) .................................................. 982837

(51) Int. Cl.$^7$ ................................................. G02F 1/13
(52) U.S. Cl. ....................................................... 349/199
(58) Field of Search .............................. 349/20, 72, 199

(56) References Cited

U.S. PATENT DOCUMENTS

| | | | |
|---|---|---|---|
| 4,394,407 A | 7/1983 | Blazso | 427/150 |
| 4,723,656 A | 2/1988 | Kiernan et al. | 206/333 |
| 4,917,643 A | 4/1990 | Hippely et al. | 446/14 |
| 5,085,607 A | 2/1992 | Shibahashi et al. | 446/14 |
| 5,430,692 A * | 7/1995 | Grupp et al. | 368/11 |
| 5,431,697 A | 7/1995 | Kamata et al. | 8/483 |
| 5,484,205 A * | 1/1996 | Grupp et al. | 374/142 |

FOREIGN PATENT DOCUMENTS

| WO | WO 98/56221 | 12/1998 |
|---|---|---|

OTHER PUBLICATIONS

Patent Abstracts of Japan, JP4059398.
Hallcrest Product and Application Information Brochure—10 pp.

* cited by examiner

Primary Examiner—Toan Ton
Assistant Examiner—Andrew Schechter
(74) Attorney, Agent, or Firm—Perman & Green, LLP

(57) ABSTRACT

The cover or keyboard of an electronic device or a portable mobile station is coated or mixed to include liquid crystals changing color with changes of temperature, or thermochromic liquid crystals (TLC). Thermochromic liquid crystals can be used to implement reversible or irreversible color changes on several different color change temperature ranges. The cover (C) changes its color when changing temperature forming patterns (A1) following heat gradients, in its TLC-comprising parts. The color change indicates both heat applied externally to the mobile station and the heating caused by the internal energy consumption of the mobile station.

18 Claims, 1 Drawing Sheet

MOBILE STATION AND COVER FOR MOBILE STATION HAVING THERMOCHROMIC LIQUID CRYSTALS

FIELD OF THE INVENTION

The present invention relates to electronic devices, especially changing the color of the cover of an electronic device.

The cover of an electronic device, e.g. a mobile station, has multiple functions like protecting the product from dirt, mechanic stress and electromagnetic interference. The cover can also be used to give a desired appearance to the mobile station. Plastics and metals have certain basic colors, and when producing covers in other colors, these materials can be colored e.g. with paint or lack, coated with a material with the desired color (e.g. chromed) or a plastic cover can be mixed with color pigments. An effect known from prior art is implemented in the Nokia 6110 mobile station. The spectrum of the light reflected by the phone depends on the angle of reflection, and thus it looks as of somewhat different color when viewed from different directions.

Another special effect known from prior art concerning the color of a mobile station is presented in a patent application publication WO 98/56221. The publication presents a cover of a mobile station, which cover changes color reversibly, and the color of which depends on the intensity of the ultra-violet radiation it is subjected to. The capability has been implemented by coating the cover with or by mixing into it crystals that change color when subjected to ultra-violet radiation.

Generally a mobile station comprises a display, and because of this it is quite easy to dial even lengthy phone numbers. However, sometimes the dialing user might forget, which button was last pressed. This can of course be easily found out e.g. by moving one's eyes from the keyboard to the display, but it would be referable to show, especially to elderly users, the last pressed key or keys, and even more preferably show the order in which they have been pressed.

It would be preferable for a person with children in the family to easily find out from his/her mobile station, if the children of the family have used the phone without permission, or if a call initiated from the mobile station has otherwise been left unfinished.

Manufacturing a mobile station requires relatively high technical know-how, but on the other hand manufacturing e.g. its colored covers and batteries is much simpler and thus more vulnerable to piratism. The original manufacturer should preferably also supply the accessories used in their mobile stations, because a badly fitting colored cover can impair the quality of a well-made mobile station. Unsuitable batteries may also in the worst case cause a security risk. New hard to imitate technical methods should be employed in order to easily distinguish the manufactured product from imitation products.

SUMMARY OF THE INVENTION

The present invention is an electronic device, a cover of the electronic device and a method of manufacturing the cover of an electronic device, the outer surface of which cover comprises a material that changes color with temperature, such as the TLC's or Thermochromic Liquid Crystals manufactured by Hallcrest Ltd. The color of an electronic device manufactured in this way will change with the changes in the temperature of the cover of the electronic device. Heat coming both from inside and outside the unit causes this: kind of changes in temperature.

According to another embodiment of the present invention at least a part of the keys of the electronic device, and/or a key frame surrounding them comprises a material that changes its color reversibly with temperature, in order to show the numbers or operations last selected. When the user has pressed a key and the part of the keyframe surrounding the key on the keyboard that is of room temperature with her finger that is several degrees centigrade warmer than the keyboard, a color-changing area like this first changes its color and then starts slowly to reassume the color of its surroundings. During the reversing period the user can, however, see the key that has a color different from its surroundings, and therefore deduce that the key has been recently used.

An electronic device's cover according to a third embodiment of the present invention comprises a substance that changes its color in high or low temperature, which color change indicates a temperature hazardously high or low for the mobile station. Preferably the change of color is arranged to take place a little before the temperature of the electronic device reaches a value hazardous to it.

An advantage of the invention is that the use of an electronic device based on a change in temperature can be visibly indicated with a completely passive structure without shortening the standby time of the battery of an electronic device and without any electronic components. As an additional advantage of the present invention the color change can indicate unauthorized and unwitting use of the electronic device. When a device according to the present invention has been used without authorization, it returns to a certain balance temperature and its color will correspond to this temperature and the cover temperature profile, but during the reversing it can easily be seen that the device has been used, with the prerequisite that, e.g. a mobile station heats up to a temperature different from its normal environment, when pressed against the ear, and enters the color change region of a temperature-sensitive material. In this way it is possible to instantly recognize an unauthorized use of an electronic device. It is also possible to check that a call has not been made from a mobile station for the purpose of eavesdropping leaving the line open in order to facilitate secret monitoring. In the same way it is of course possible to recognize a call left accidentally unfinished.

The devices most suitable for the use of the present invention are hand-held or portable electronic devices, like mobile stations, cordless phones, portable stereos, dictation machines, Personal Digital Assistants (PDA-devices), laptop computers, electronic games, watches, remote controllers, digital blood pressure gauges, virtual reality helmets, game controllers, computer mouses, pocket calculators and alarm clocks.

According to the invention, there is provided an electronic device with a cover, wherein the cover comprises thermochromic liquid crystals capable of at least partially reversible color change in order to bring about a change of color in response to a change in the temperature of the cover.

According to the invention, there is provided a cover to an electronic device, comprising thermochromic liquid crystals capable of at least partially reversibly color change in order to cause a color change in the cover in response to a temperature change in the cover.

According to the invention, there is provided a method for at least partially reversibly changing the color of an electronic device with a cover, comprising the steps of:

introducing in the cover thermochromic liquid crystals capable of color change; and subjecting the cover to a change of temperature, whereby the color of the cover changes as a response to the change of temperature in the cover.

BRIEF DESCRIPTION OF THE DRAWINGS

In the following the present invention is explained using a mobile station as an example referring to the included drawings, where.

DETAILED DESCRIPTION

A brochure from the Hallcrest Inc. explains the properties and use of TLC-materials. The crystals are chemical compounds, cholesteric liquid crystals. TLCs change color from one color to another according to temperature changes and their constitution can be altered in such a way that their color changes can occur in a wide temperature area. A TLC can be stabilized and protected with a process known as a micro-encapsulation process, where they also change into a more easily handled form. Simplified, a microcapsule is a ball surrounded by a continuous wall. The diameter of a micro capsule ranges usually from a few micrometers to a few millimeters. There are so-called digital and analog TLC-indicators. The digital implementations are older and only one change of color indicating a defined change of temperature takes place at any one time. Differently from this in analog indicators the change of color is continuous, and the color can change e.g. from black to green and then to blue or red. The operating range of TLCs covers the interval between −30 centigrades and 120 centigrades and the extremes of the bandwidth of their temperature indication are 0.5 centigrades and 25 centigrades.

Figure 1:
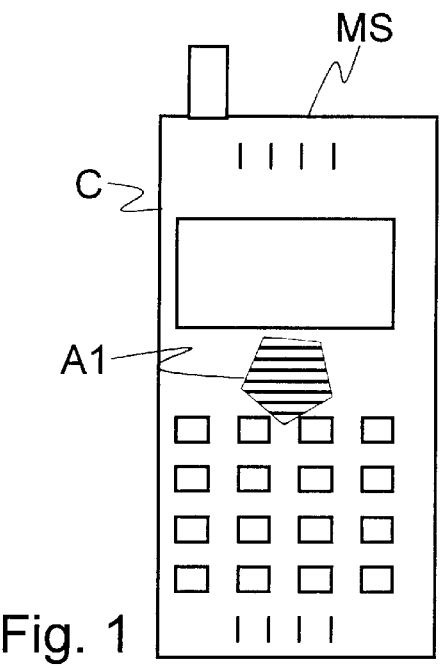
FIG. 1 presents a mobile station according to a first embodiment of the present invention, seen from the front.

FIG. 1 presents a mobile station MS according to a first embodiment of the present invention. The cover is plastic or metallic material, of the exterior surface of which area A1 has been painted with paint containing thermochromic liquid crystals, i.e. crystals that change color with heat. Alternatively the crystals can be joined with the surface by lacquering the cover with a TLC-containing lacquer or by coating the cover with other TLC-containing material like ceramic or by mixing the cover material with TLC's. Furthermore, TLC can alternatively be applied to cover on the whole area of the cover.

The cover material can comprise steel, aluminum, magnesium, gold, silumine or other metal, metal mix and/or plastic of the hardness and density along with the workability and processability that is required for its use, preferably a shock-proof plastic such as polycarbonate (PC), acrylonitrite-butadien-styrene (ABS) or a mixture of the above mentioned. Thermochromic liquid crystals (TLC) can be preferably but not necessarily used micro encapsulated in various coating materials, like plastics and paints, as a laminate layer, or they can be mixed into the plastic already before injection molding. A mobile station comprising TLC crystals will change its color at least partially according to the current temperature in its environment (user's pocket, hand, pressed against users ear and/or cheek during a call, on a table etc.). Another example of a strong change of temperature of the environment is the change occurring in the Nordic countries in wintertime when moving from outdoors to indoors, where the temperature of the air surrounding a belt-mounted mobile station may change from e.g. −10 centigrades to +20 centigrades. Preferably an electronic device according to the present invention can be arranged to have a warning to indicate a battery weakened by low temperature by arranging the cover of a mobile station to have a pattern formed with TLC, which pattern emerges in e.g. −10 centigrades.

Thermochromic liquid crystals can be placed in a certain place on the cover, as presented in FIG. 1. An exemplifying marking A1 has been formed in the cover C of a mobile station MS. Thermochromic liquid crystals can be used to form patterns with several different techniques in addition to patterns formed on the surface of the cover. Thus a point that changes color in a manner differing from the surrounding material can be separated from an area on the surface of the cover, which area changes color uniformly. The following of these techniques are to be mentioned:

Spreading thermochromic liquid crystals unevenly with respect to the external surface of the cover part, e.g. a desired pattern is painted or lacquered on it with TLC containing paint or lacquer.

Mixing at least two different types of thermochromic liquid crystals unevenly with respect to the external surface of the cover. Thus two patterns visible in different temperatures can be formed.

Mixing translucent cover material unevenly with thermochromic liquid crystals along the thickness axis, whereby when heat is conducted from the cover surface a portion of the liquid crystals warm up first and an uneven color change takes place in the cover.

Covering the thermochromic liquid crystals on the cover with a layer of opaque pigment in a certain pattern, which causes the color of the cover in this area not to change with a change in temperature, but the liquid crystals around the cover change color and make the pattern visible.

Forming unhomogenically heat conducting parts, e.g. dents, grooves, cracks into the cover or a material that conducts more or less heat than the cover material is mixed unevenly with the cover material. Hence, the thermal load on the cover material is unevenly spread with respect to the external surface and leads to an uneven response in the color of the cover even when it meets with an even change in temperature.

Arranging parts of the cover to have specific heat capacity different from the surrounding cover material. Thus the heating and cooling of these parts differs from their surroundings and forms a color difference with respect to its surroundings.

Forming thickness variations to the cover. In thicker portions the cover has a greater thermal quantity and the changes are slower than in thinner parts. Moreover, heat is conducted slower through the thicker parts and the effect of a heat source on in some other direction heats the liquid crystals on the opposite edge slower than the crystals around it.

Figure 2:
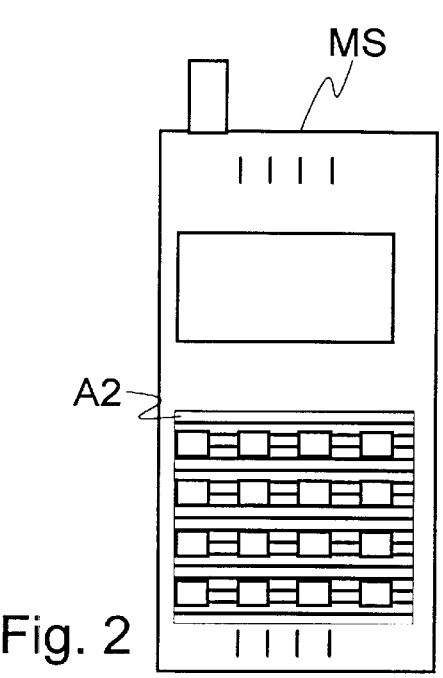
FIG. 2 presents a mobile station according to a second embodiment of the present invention, seen from the front.

FIG. 2 presents a frontal view of a mobile station according to a second embodiment of the present invention. The keyboard is surrounded by a part A2 of the cover painted with a TLC-containing coating. When the mobile station is used, the finger pressing the key and the key frame around the key heats the part of the cover around the key and causes a change of color in part A2. The change in color is well visible when using a TLC with a color change area of 23 . . . 29 centigrades. Preferably the half-life of the change of color is in this case between 1 second and 1 minute. The color change of the keyframe is best realized when the key is on the level of the keyframe or very close to it. When the reversing is fast, the trace left by the use of a key quickly disappears, but the resolution of the use of a key is better. In practice the choice of a correct reversing speed for the use is an exercise in optimization, where the speed of the user and the normal amount of sequential keypresses have to be taken into consideration.

Figure 3:
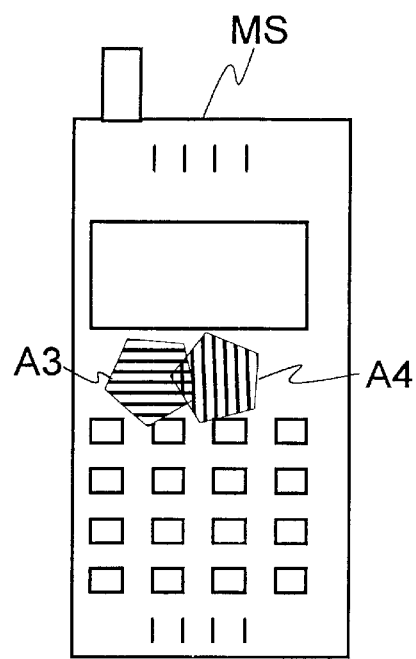
FIG. 3 presents a mobile station according to a third embodiment of the present invention, seen from the front.

Because there are TLC-crystals with different color ranges, several areas with crystals with different colors can exist on the same cover, as presented in FIG. 3. In the mobile station MS there is one pattern A3 with vertical stripes, that becomes visible when temperature is about 23 centigrades to 29 centigrades and another pattern A4 that becomes visible when temperature rises to about 27 centigrades to 33 centigrades. As presented in the example, several overlapping patterns simultaneously visible on certain temperature areas can be formed on the cover.

In a third embodiment of the present invention a warning signal or signals are formed on the cover of a mobile station with such color-changing material, whose color change area reaches at least close to a temperature harmful to the mobile station, e.g. over +70 centigrades. This provides a way to implement an overheating protection for a mobile station e.g. forgotten on the air conditioning vent of a car or in direct sunlight. Similarly it is possible to implement another warning symbol to indicate e.g. an increase in material frailness caused by extreme sub-zero temperatures and to warn the user from letting the mobile station receive strong impact or stress, when its temperature has lowered to under e.g. −20 centigrades.

The embodiment and implementations of the present invention have been presented here with examples. It is evident to a man skilled in the art that the present invention is not confined to the details of the implementations presented above and that the present invention can be implemented in an other form without deviating from the characterizing features of the present invention. The presented implementations should be viewed as illuminating, but not confining. Thus the only constraints of the implementation and use of the present invention are those imposed by the enclosed patent claims. Thus the different alternative embodiments of the present invention defined by the claims along with equivalent embodiments belong to the area of the present invention.

What is claimed is:

1. A mobile station with a cover, wherein the cover comprises:
   thermochromic liquid crystals capable of color change in order to bring about at least a partially reversible change of color in response to a change in a temperature of the cover.

2. A mobile station according to claim 1, wherein said thermochromic liquid crystals have been micro-capsulated.

3. A mobile station according to claim 1, wherein the cover comprises thermochromic liquid crystals on a defined area that is at least a part of the externally visible area of the cover.

4. A mobile station according to claim 1, wherein said cover comprises an outer surface and the cover comprises at least one of the following for forming a pattern of color change visible on the external surface;
   thermochromic liquid crystals spread unevenly with respect to the external surface of the cover in order to form a pattern that changes color as a function of temperature;
   at least two different types of thermochromic liquid crystals unevenly spread with respect to the external surface of the cover, changing their color differently with a similar change of temperature, in order to form at least two different patterns visible in different temperatures;
   thermochromic liquid crystals mixed into the cover material unevenly spread along the thickness axis of the cover material;
   a substantially opaque layer of pigment unevenly covering the thermochromic liquid crystals comprised by the cover material, in order to cover some of the liquid crystals;
   unhomogenically heat-conducting parts in order to spread the heat load on the cover material unevenly with respect to the external surface in order to spread the heat power of the thermochromic liquid crystals in an uneven way, in order to produce a patterned color change;
   parts differing from their surroundings in their heat capacity in order to spread the heat load on the cover material unevenly with respect to the external surface in order to spread the heat power of the thermochromic liquid crystals in an uneven way, in order to produce a patterned color change; and
   thickness changes in order to spread the heat load on the cover material with respect to the external surface in order to spread the heat power of the thermochromic liquid crystals in an uneven way, in order to produce a patterned color change.

5. A mobile station according to claim 1, wherein the cover comprises an external surface visible outward from the mobile station and an internal surface inwards into the mobile station; and
   the cover comprises at least one of the following;
   on its external surface, a coating material comprising thermochromic liquid crystals;
   on its internal surface, a coating material comprising thermochromic liquid crystals and a part of the cover is at least partially transparent in order to make the color changes in the liquid crystals inside visible to outside;
   thermochromic liquid crystals mixed into the cover in order to make visible the color changes in at least those liquid crystals near the external surface; and
   thermochromic liquid crystals changing color in at least two different temperature ranges joined into a substantially same visible area of the cover in order to increase the temperature range of the color change.

6. A mobile station according to claim 1, wherein said mobile station comprises a power source and a load formed by at least one electronic component that consumes variable amounts of power from the power source; and
   said color change indicates the power consumed by the load from the power source.

7. A mobile station according to claim 1, wherein the color change of said thermochromic liquid crystals of the cover has been arranged to take place when the mobile station reaches a temperature harmfully high or low to the operation of the mobile station.

8. A cover to a mobile station, wherein the cover comprises thermochromic liquid crystals capable of at least partially reversible color change in order to cause a color change in the cover in response to a temperature change in the cover.

9. A cover according to claim 8, wherein said thermochromic liquid crystals have been micro encapsulated.

10. A cover according to claim 8, wherein said cover comprises an external surface and said cover comprises, in order to form a patterned change in color visible on the external surface, at least one of the following:
- thermochromic liquid crystals spread unevenly with respect to the external surface of the cover in order to form a pattern that changes color in a function of temperature;
- at least two different types of thermochromic liquid crystals unevenly spread with respect to the external surface of the cover, changing their color differently with a similar change of temperature, in order to form at least two different patterns visible in different temperatures;
- thermochromic liquid crystals mixed into the cover material unevenly spread along the thickness axis of the cover material;
- a substantially opaque layer of pigment unevenly covering the thermochromic liquid crystals comprised by the cover material, in order to cover some of the liquid crystals;
- unhomogenically heat-conducting parts in order to spread the heat load on the cover material unevenly with respect to the external surface in order to spread the heat power of the thermochromic liquid crystals in an uneven way, in order to produce a patterned color change;
- parts differing from their surroundings in their heat capacity in order to spread the heat load on the cover material unevenly with respect to the external surface in order to spread the heat power of the thermochromic liquid crystals in an uneven way, in order to produce a patterned color change; and
- thickness changes in order to spread the heat load on the cover material with respect to the external surface in order to spread the heat power of the thermochromic liquid crystals in an uneven way, in order to produce a patterned color change.

11. A method for changing at least partially reversibly a color of a mobile station with a cover, comprising the steps of:
- introducing in the cover thermochromic liquid crystals capable of color change; and
- subjecting the cover to a change of temperature, whereby the color of the cover changes as a response to the change of temperature in the cover.

12. A method according to claim 11, wherein
the cover comprises an external surface visible outward from the mobile station and an internal surface into the mobile station; and
the application of the thermochromic liquid crystals comprises at least one of the following;
- coating the external surface of the cover with a coating material containing thermochromic liquid crystals;
- coating the internal surface of an at least partially transparent cover with a coating material containing thermochromic liquid crystals;
- mixing thermochromic liquid crystals into the basic material of the cover when it is manufactured; and
- applying thermochromic liquid crystals that change their color on at least two different temperature ranges onto the external surface of the cover in order to increase the temperature range of the color change.

13. An electronic device comprising:
a cover; wherein the cover includes thermochromic liquid crystals capable of color change in order to bring about at least a partially reversible change of color in response to a change in a temperature of the cover; and
a keyboard with at least one key; the keyboard including thermochromic liquid crystals arranged on at least one part of one key on the keyboard to indicate a use of the key.

14. The electronic device of claim 13, wherein the thermochromic liquid crystals are arranged on a part of the cover surrounding the key.

15. A mobile station with a cover, wherein the cover comprises thermochromic liquid crystals capable of color change in order to bring about at least partially reversibly change of color in response to a change in a temperature of the cover caused by a user touching the cover to indicate use of the mobile station, and the thermochromic liquid crystals are contained in a coating applied on the cover or mixed into a cover material.

16. A mobile station according to claim 15, wherein thermochromic liquid crystals are arranged to change color in response to temperature change caused by one of: a user's hand, a user's finger, the mobile station being in a user's pocket, or the mobile station being pressed against a user's ear or cheek.

17. A cover for a mobile station, wherein the cover comprises thermochromic liquid crystals capable of at least partially reversible color change in order to cause a color change in the cover in response to a temperature change in the cover caused by a user touching the cover to indicate use of the mobile station, and the thermochromic liquid crystals are contained in a coating applied on the cover or mixed into a cover material.

18. A method for indicating use of a mobile station, wherein the method comprises the steps of:
- introducing into a cover of the mobile station thermochromic liquid crystals capable of color change as a response to a change of temperature; and
- subjecting the cover to a change of temperature by a user touching the cover, wherein a color of the cover changes as a response to the change of temperature in the cover caused by the user to indicate use of the mobile station.

* * * * *